No. 624,023. Patented May 2, 1899.
A. J. HEINE.
BAND CUTTER AND FEEDER.
(Application filed Jan. 6, 1899.)
(No Model.) 5 Sheets—Sheet 1.

WITNESSES:
E. G. Staude
H. O. Weaver

INVENTOR,
AUGUST J. HEINE.
BY Paul D. Hawley
HIS ATTORNEYS.

No. 624,023. Patented May 2, 1899.
A. J. HEINE.
BAND CUTTER AND FEEDER.
(Application filed Jan. 6, 1899.)

(No Model.) 5 Sheets—Sheet 2.

WITNESSES:
E. G. Staude
H O Weaver

INVENTOR
AUGUST J. HEINE.
BY
Paul O Hawley
HIS ATTORNEYS.

No. 624,023. Patented May 2, 1899.
A. J. HEINE.
BAND CUTTER AND FEEDER.
(Application filed Jan. 6, 1899.)
(No Model.) 5 Sheets—Sheet 3.

WITNESSES.
E. G. Staude
H. O. Weaver

INVENTOR,
AUGUST J. HEINE.
BY Paul O. Hawley
HIS ATTORNEYS.

No. 624,023. Patented May 2, 1899.
A. J. HEINE.
BAND CUTTER AND FEEDER.
(Application filed Jan. 6, 1899.)

(No Model.) 5 Sheets—Sheet 4.

FIG. 14

WITNESSES:
E. G. Staude
H. O. Weaver

INVENTOR
AUGUST J. HEINE.
BY Paul O Hawley
HIS ATTORNEYS.

UNITED STATES PATENT OFFICE.

AUGUST J. HEINE, OF WAHPETON, NORTH DAKOTA.

BAND-CUTTER AND FEEDER.

SPECIFICATION forming part of Letters Patent No. 624,023, dated May 2, 1899.

Application filed January 6, 1899. Serial No. 701,389. (No model.)

*To all whom it may concern:*

Be it known that I, AUGUST J. HEINE, of Wahpeton, Richland county, State of North Dakota, have invented certain new and useful Improvements in Band-Cutters and Feeders, of which the following is a specification.

My invention relates to band-cutters and feeders for threshing-machines; and the object of my invention is to provide a device of this class which will automatically cut the bundle-bands, spread the grain, and feed the same into the threshing-cylinder without clogging or overloading said cylinder, regardless of the condition or length of the straw.

Heretofore band-cutters and feeders have been devised which successfully handle grain that is light and dry, but are ineffective and useless for work with any material that is not in perfect condition—that is, a bundle of grain that happens to be wet, heavy, or soggy will either break the machine or, if it gets through the same, will be so imperfectly fed to the cylinder as to clog and stop it. Other machines are found to be useless in threshing short straw, while others that are designed for handling straw of the ordinary length will clog and operate imperfectly upon extra-long bundles. Few band-cutters and feeders have any means whatever to effectually limit the feed of the bundles to the cutting-knives. I attribute the more or less marked failure of band-cutters and feeders to the adoption by most inventors of the principle of compressing the grain and forcing the same to the threshing-cylinder. The capacity of such machines must of necessity be limited, the chances of breakage and stoppages great, and the grain so fed poorly threshed.

The gist or principle of my invention lies in freeing the straw before reaching the cylinder and in limiting the quantity or volume that can be advanced in proportion to the speed and capacity of the threshing-cylinder and in delivering no grain to the threshing-cylinder when its speed is not high enough to do good work. As it is easier to first hold and then drop an article than to move the same, a machine built upon this principle is of simpler construction and less apt to get out of order than one that embodies the force-feed or crowding idea.

My invention consists generally in the combination, with the threshing-cylinder, of a bundle-carrier adapted to deliver the bundles of grain upon knives that are interposed between said carrier and the cylinder and which cut the bands and instantly spread the bundles and a superimposed retarding device that moves toward said cylinder, but operates at a much slower speed than said knives to hold back the upper parts of the bundles until the lower parts, being freed from the the knives, fall or pass to the cylinder, the upper parts being then dropped from or by said retarding device to follow into the cylinder.

My invention further consists in the arrangement of the cylinder, knives, and retarding device to allow an entirely free space before the cylinder large enough so that the material having once passed the knives will be in a light loose condition for easy and rapid disposition by the cylinder.

My invention further consists in constructions permitting the adjustment of the machine to the exact conditions of the work to be performed at different times; and my invention also consists in novel stop and speed-governing means and in means that prevent the clogging of the knives and the retarding appliance by an accumulation of bundles upon the carrier.

Further, my invention consists in a certain construction of the carrier and its relation to the main frame of the machine permitting the folding of the carrier in compact form and allowing the use of a carrier practically of any desired length; and the invention consists also in details of construction and in combinations of parts, all as hereinafter described, and particularly pointed out in the claims.

My invention will be more readily understood by reference to the accompanying drawings, forming part of this specification, and in which—

In the drawings, 2 represents the threshing-machine, of which 3 is the cylinder, and 4 the cylinder-concave.

5 represents the frame or body of the band-cutter and feeder, which conforms in size and shape to the space required for operating parts. The bottom of this frame is formed by reciprocating board or pan 6, that advances to the cylinder any kernels of grain that are threshed within the feeder. These boards are operated by a crank-shaft 7, the bearings of which are on the frame 5, and the ends of the boards rest upon a removable ledge or plate or feed-board 8, secured between the sides of the frame 5 and immediately before the cylinder. I prefer to employ rotary knives having long cutting edges or blades, and these knives 9 are arranged upon a shaft 10 within the body 5 and in front of and considerably above the cylinder 3.

11 represents a curved floor or plate, suitably secured and through slots in which the blades of the knives operate, said plate preventing the wrapping of straw upon the knives or the knife arbor or shaft 10. This plate is preferably elevated to a level above the top of the cylinder, and the distance between the knives and the cylinder is approximately the length of the straw to be handled, it being preferred that the straw should be free from the knives before the grain-heads enter the cylinder; otherwise the knives, which operate at a slower speed than the cylinder, would tend to retard the lower parts of a bundle, which should be free to spread and pass to the cylinder the instant that the band is cut.

Figures 3, 11, 12, 13:
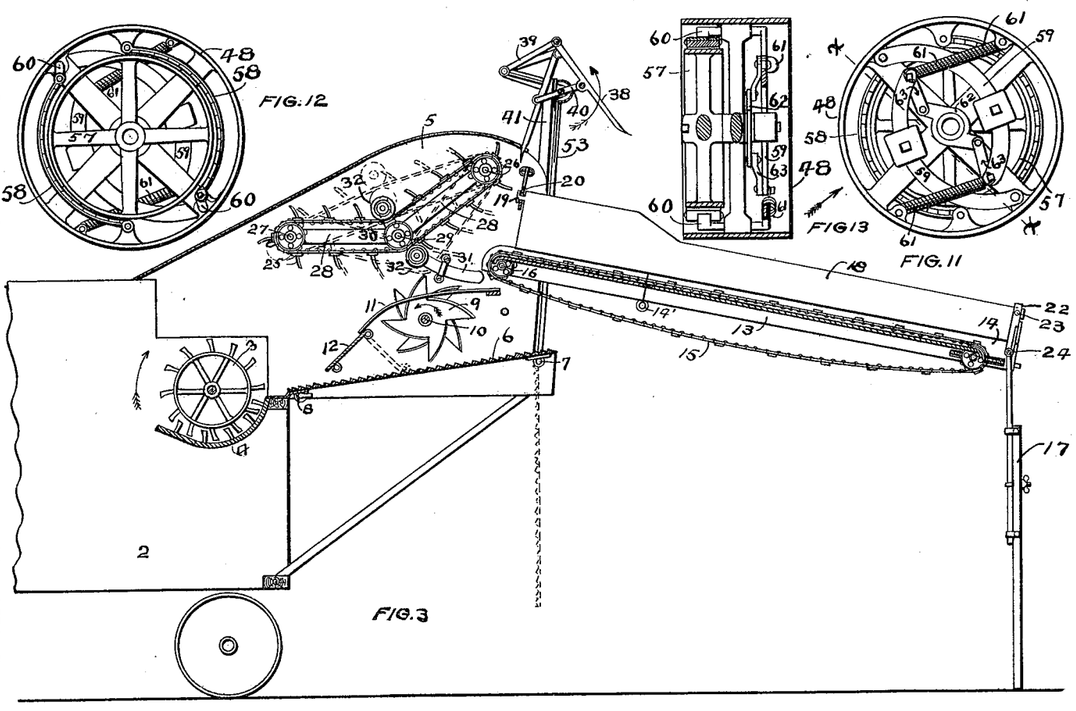
Fig. 3 is a vertical section of the machine.
Fig. 11 is a detail of the governor.
Fig. 12 shows the opposite face thereof.
Fig. 13 is a sectional view of the governor.
Figure 7:
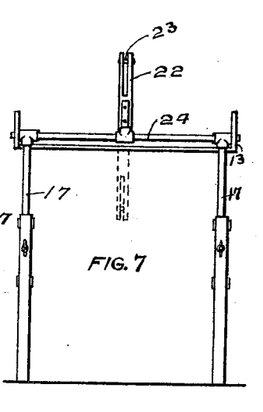
Fig. 7 is an end view of the carrier.
Figure 8:
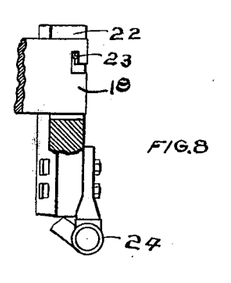
Figs. 8 and 9 are detail views showing the means for attaching the dividing-board of the carrier.

12 represents an inclined guide-plate, practically a continuation of the plate 11, but which also serves another purpose. It is hinged at its upper edge to be held in either of the positions indicated in Fig. 3. Its office in the full-line position has been defined. When in the dotted-line position, it serves to cover the knives, and thus prevent accident to a person in the act of inspecting or repairing the cylinder, which latter can be readily gotten at by dropping the pan 6 upon the removal of the plate or feed-board 8. The conveyer or carrier 13 comprises a trough 14, over the floor of which the slat-conveyer 15 operates. Said trough is pivoted upon the conveyer-shaft 16, held in bearings on the body or frame 5, and the inclination of the conveyer may be adjusted at will by means of the adjustable legs 17 at the free end thereof. The conveyer is wide enough to accommodate the bundles side by side, and to place the bundles properly as they are thrown upon the conveyer I employ the divider 18 in the usual position, but differing from others in the means of its attachment to the body of the machine and the outer end of the conveyer. The forward end of the divider is provided with a T 19, the head of which is parallel with the edge of the wall.

Figures 2, 4, 5, 6:
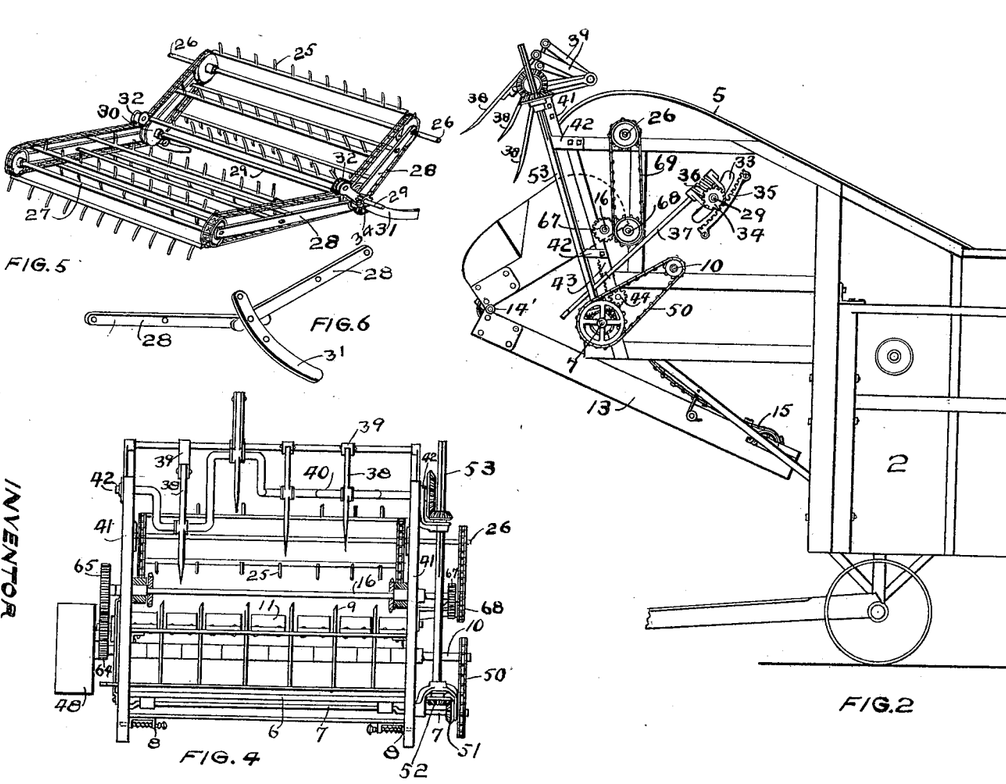
Fig. 2 is a view of the opposite side of the machine and shows the carrier folded.
Fig. 4 is a view of the forward end of the feeder with the carrier removed.
Fig. 5 is a perspective view of the retarding device.
Fig. 6 shows one side of the hinged frame thereof.
Figure 9:
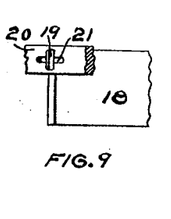
Figure 14:
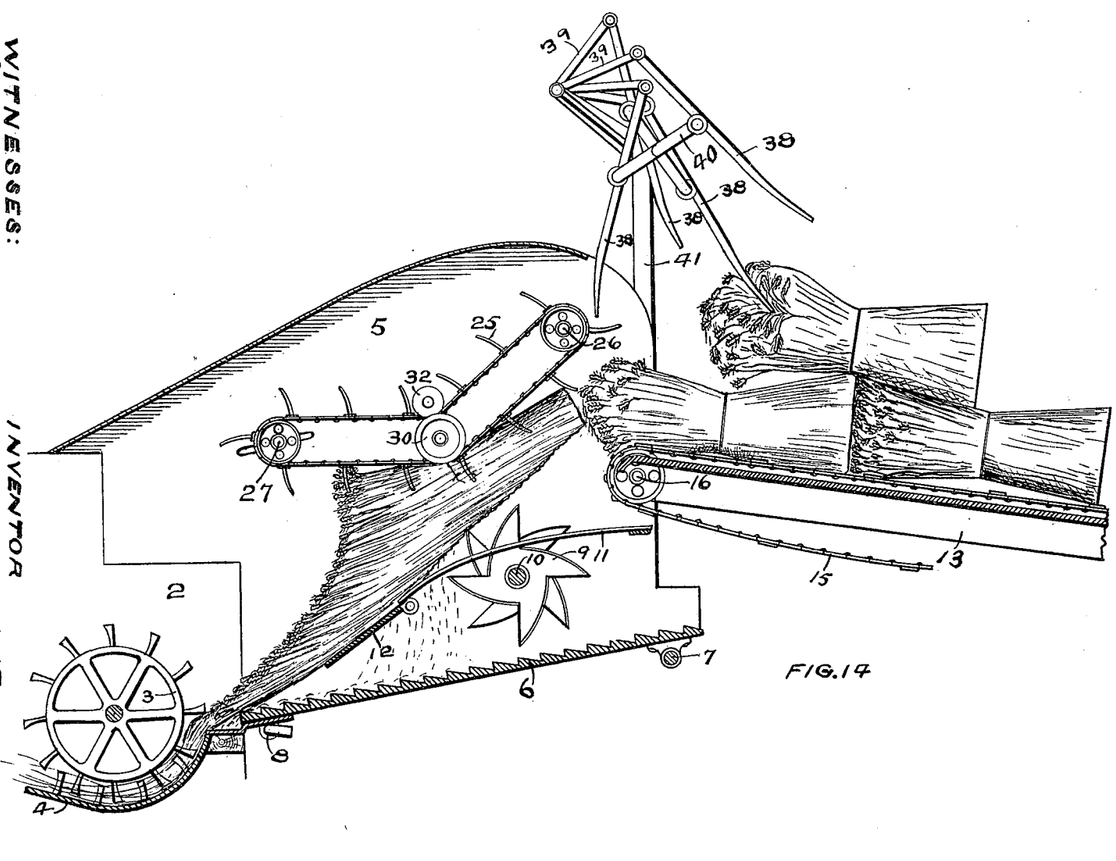
Fig. 14 is a sectional view of the band-cutter and feeder, illustrating the operation thereof.
Figures 15, 16:
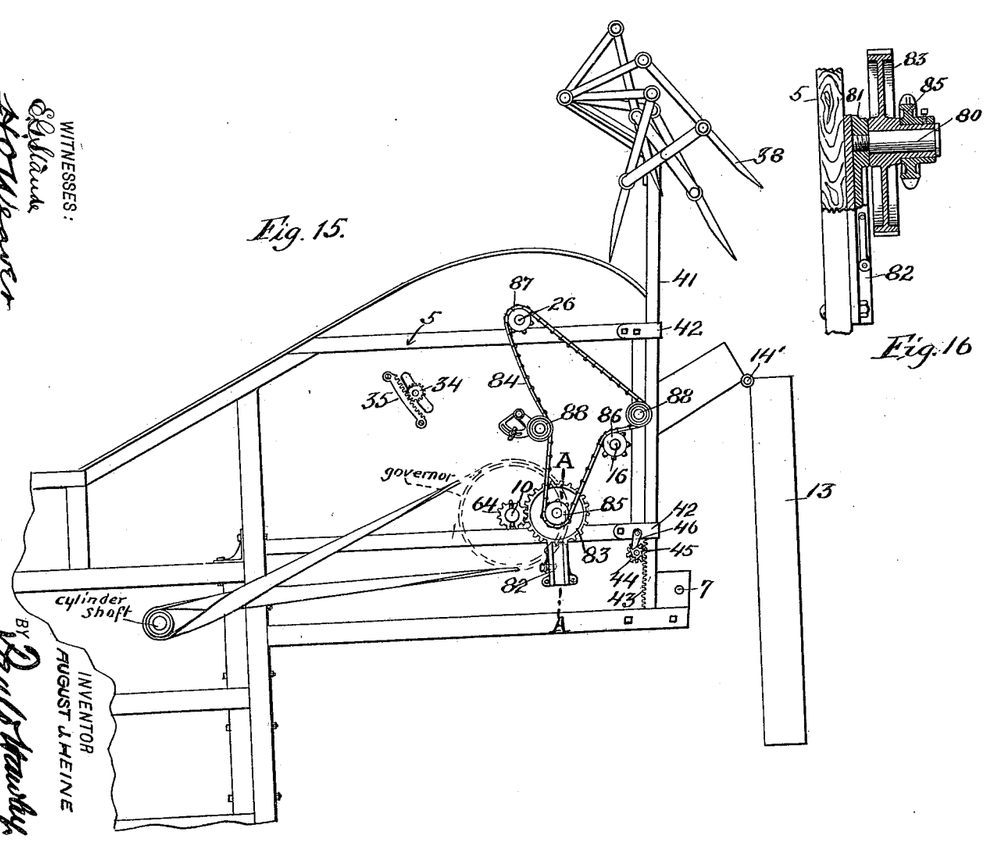
Fig. 15 is a side elevation of the machine, showing modified means for driving the several parts.
Fig. 16 is an enlarged sectional view on line A A of Fig. 15.

20 represents a cross-bar, and this (see Fig. 9) is provided with a slot 21 at right angles to the normal position of the T 19. The board or divider 18 is held side downward to insert the T and is then dropped thereon as a pivot, and the outer end is placed between the arm 22 and hooked over a pin 23 between the same. Said arm 22 is arranged on the cross-bar 24, held in the sides of the trough beyond the end of the conveyer. The lower end of the board therefore has a pivotal connection with the trough, which permits the trough to be adjusted without affecting the rigid fastening of the board between the arms 22. For convenience the legs 17 are pivoted on the cross-rod 24. When threshing loose material, the divider is taken out and the arm 22 is swung down, as shown in Fig. 15. The conveyer-trough is made in two sections, the forward section being short and having high sides to hold several layers of bundles that may accumulate before the knives. The lower section of the conveyer-trough is hinged to the upper section, and owing to the ability of the short section to swing on its pivot or center 16 any practical length of trough may be used for the lower section and yet permit said lower section to be dropped, then raised at the hinge 14', and then swung back under the body of the feeder and fastened, as shown in Fig. 2. The conveyer-shaft 16 at the forward end of the conveyer is preferably above the knives and back of the same, whereby as the bundles are brought up to the knives their ends will tilt down onto the plate 11 and they will the more readily slide down over the knives, which cut the bands from the under sides of the bundles, and, operating with the weight of the upper parts of the bundles and the retarding device, cause the instant spreading thereof into an even layer upon the guard-plate or floor 11, the forward end of which dips downward and, with the rapidly-moving knife, insures the free and easy flow or fall of the straw toward the cylinder. It will be evident that in the absence of any restraining or retarding device above the knives the tops of the bundles—that is, the upper sides thereof—would be carried or thrown over almost as quickly as the lower parts and there would be danger of throwing all of the bundle onto the top of (or into) the cylinder, (at once,) which action would result in stopping or clogging the same. I therefore arrange above the knives a retarding and feed-regulating device capable of holding the upper part of the bundle, but without materially compressing the bundle, and so arranged as to entirely free the ends of the straw after the same have passed the knife. This device comprises an endless belt extending from side to side of the body or frame 5, operating longitudinally in said frame and provided with a number of backwardly-extending teeth 25, the belt being preferably made up of links, belts, and cross-slats, on which slats said teeth are fixed. The teeth need not of necessity be curved, as shown, as perfectly straight teeth would serve the purpose, though not as well. This belt is driven at its upper and outer end, its sprocket-wheels being fixed upon the shaft 26, which extends through the side of the frame 5. The sprocket-wheels at the opposite end of the belt are carried upon a shorter shaft 27, the ends of which may rest upon suitable guides or in slots in the sides of the frame. The two shafts 26 and 27 are connected by a toggle-frame comprising hinged bars 28, at the hinge of which is a shaft 29, carrying idler-wheels 30 to engage the insides of the belts. There are cross pieces or bars 31 also at this point, and these carry idlers 32 to engage the outer side of the belt, whereby this retarding device may be adjusted vertically at the middle to vary the distance between the same and the knives beneath. The change of distance between the shafts 27 and 26 is permitted by the rests or guides whereon the shaft 27 or the side bars 28 rest. For adjusting the belt above the knives I prefer to extend the shaft 29 through slots 33 in the sides of the frame and provide small pinions 34 therein, which pinions engage curved racks 35 upon said sides and for convenience are operated by a worm 36, engaging one of the pinions or a worm-gear on the shaft 29. The worm moves with the shaft 29, and for convenience in operating the same I extend the worm-shaft 37 downwardly at an incline to a point where a crank may be readily attached by a person standing on the ground. In order to cover the curved slots 33 I prefer to extend the cross-bars 31, as shown in Figs. 2, 5, and 6. The retarding belt or device operates upon its under side toward the cylinder and at a slower speed than the knives. The teeth upon the under side of the belt enter the tops of the bundles, assist in tipping the bundles onto the knives, and hold back or retard the progress of the upper part of the bundles. It will be noted that there is plenty of room for the entrance of the bundle beneath the retarding device and that the belt approaches the knives until opposite the same and then diverges and, so to speak, rises to leave plenty of space above and in front of the cylinder. As illustrated in Fig. 14, practically the whole upper half of the bundle is held back until the lower part is free from the knives and passes to the cylinder, whereupon the upper part will settle upon the curved floor and follow into the cylinder. The distance between the middle point of the retarding-belt and the knives is adjusted according to the kind of material handled. If light, loose, headed grain is to be used, the distance between the retarding device and the knives may be increased compared with the distance shown in the drawings. The retarding device may then be practically straight, so that the teeth will but lightly engage the straw, the main office of the device in such a case being to prevent the straw from throwing forward at the top. But if heavy, wet, or soggy grain is to be threshed the distance will be less, to decrease the speed at which the upper part of the bundle is fed forward. This adjustment of the retarding device is made according to the general run or condition of the grain; but even when the device is adjusted for light grain the heavy bundle will be held enough to prevent clogging of the cylinder. The free joint or part of the retarding-belt nearest the cylinder is long enough to prevent straw from carrying around onto the top of the belt, and it holds down the straw that might otherwise be thrown upward by the knives. This end of the device may be somewhat nearer the cylinder than the knives, the distance being preferably less than the length of the shortest straw to be handled. Long straw is readily disposed of by the machine, for the reason that the upper portion in a bundle cannot reach the cylinder until the lower part has been drawn away. A particular advantage of this arrangement or relation between the knives, the retarding device, and the cylinder lies in the fact that, taking a bundle as a whole, the grain-heads are not fed to the cylinder all at once, but instead the bundle is shelved off, so that the grain-heads pass in succession to the cylinder, substantially as indicated in Fig. 14.

The bundle-carrier and the retarding device preferably operate at about the same speed in order that the bundle may be fed into the cylinder evenly and smoothly. The machine will effectively take care of a single bundle or pair of bundles side by side fed to it from the carrier; but it will be evident that two bundles, one on top of the other, would be crushed or wedged between the end of the carrier and the retarding device and stop or break the machine. To prevent the crippling of the machine in this way by accident or intent, I provide a feed-limiting mechanism above the conveyer and in front of the retarding device, which limiting mechanism will permit a single bundle or layer of bundles on the carrier to pass freely into the machine, but will hold back or throw off any bundle that is wrongly placed on the carrier or is put on top of another bundle thereon, thus rendering it impossible to clog the band-cutter and feeder. The limiting mechanism comprises a series of bars or kickers 38, the upper ends of which are held by pivotal links 39, while at intermediate points said bars are attached to different parts of a multiple crank-shaft 40. In operating the ends of the bars or kickers travel downward and toward the receiving end of the bundle-carrier. This crank-shaft is held in suitable bearings arranged upon vertically-adjustable bars 41 on the sides of the body 5 and slidable in bearings or boxes 42 thereon. The position of the multiple crank-shaft is such that when the kickers are thrown down the ends thereof will be substantially opposite the centers of second bundles on the carrier, as shown in Fig. 14. As bundles vary in size, it is necessary that the limiting mechanism be adjustable, and it is for this reason that the shaft 40 of the limiting mechanism is arranged upon the slidable bars 41, which are adapted to be adjusted by means of racks 43 upon the bars 41 and small pinions 44, meshing therewith. These racks are preferably arranged upon a shaft that is provided with a ratchet-wheel 45, engaged by a pawl 46, whereby said limiting mechanism may be secured at any height. Whatever the adjustment of the limiting mechanism may be it is always such that a single bundle may pass freely beneath the same in order that the same cannot interfere with the proper operation of the retarding device within the body of the feeder.

The kicker or limiting mechanism is connected with the shaft 10, as shown in Fig. 2. The driving connection comprises sprocket-wheels upon the shafts 10 and 7, connected by a sprocket-belt 50. The crank-shaft 7 operates the reciprocating pans 4. The shaft 7 is provided with a bevel-gear 51, that meshes with a similar gear 52 upon the lower end of the upright shaft 53. Bevel-gears 54 and 55 are provided upon the multiple crank-shaft 40 and the upper end of the shaft 53. The gear 55 is held in a bearing 56 upon the slidable bar 41, and said gear is adapted to move up or down upon the shaft 53, being connected therewith by a key or spline or other suitable means to cause said gear to rotate with said shaft. Any other adjustable connection would serve the purpose.

It is necessary to regulate the operation of the machine according to the speed of the threshing-cylinder, which is sometimes checked, and for this purpose I provide a governor whereby the speed of the carrier and the retarding device is materially checked or stopped when the speed of the cylinder falls, while the proportional speed of the knives and the kickers with relation to the cylinder speed is maintained to prevent the clogging of the carrier or the knives, which latter only operate well at a high speed. The governor is preferably arranged upon the shaft or arbor which carries the knives, and it is arranged in connection with or included in the pulley 48, that is secured upon the end of said shaft 10 and is driven by a belt 49 from a pulley upon the cylinder-shaft. Within or at the side of the pulley 48 is a friction-pulley 57, that is journaled upon the shaft 10, to be connected with said shaft by centrifugally-controlled clutch parts carried by the pulley 48 and adapted to engage the pulley 57. These parts preferably comprise straps 58, having their ends fastened to the inner periphery of the pulley 48, and weighted arms 59, pivoted upon said pulley 48 and connected by bell-cranks 60 to the free ends of said straps. The free ends of the arms 59 are drawn inward by springs 61, and said arms are thrown outward by centrifugal force when the pulley is rotated, thereby drawing the straps snugly upon the periphery of the pulley 57. The weights upon the arms 59 are adjustable, and to compel an equal movement of the arms I preferably connect the same by a loose cross-head 62 on the shaft 10 and links 63. When the speed of the cylinder is reduced from any cause, the straps will automatically be released from the pulley 57 by the action of springs to a greater or less extent to allow said pulley to slip or to stop, and thereby stop the conveyer and the retarding device until the speed again rises.

Figure 1:
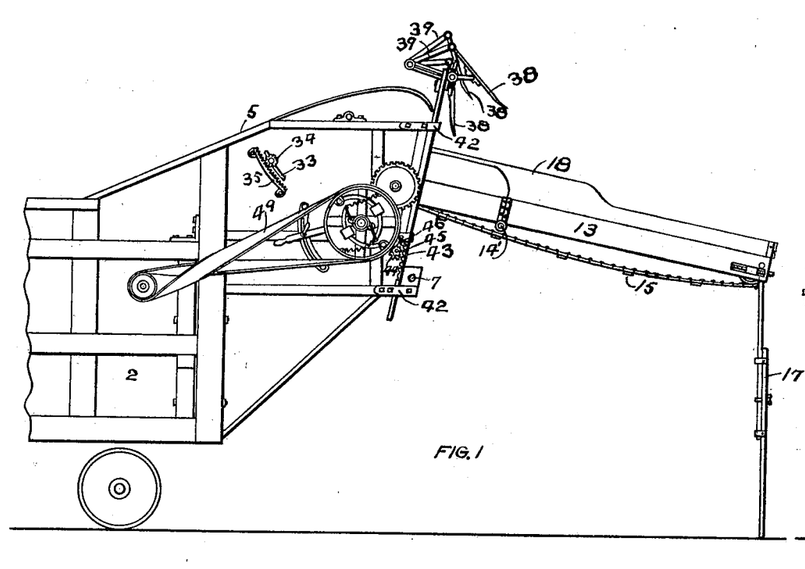
Figure 1 is a side view of a threshing-machine provided with a band-cutter and feeder embodying my invention.
Figure 10:
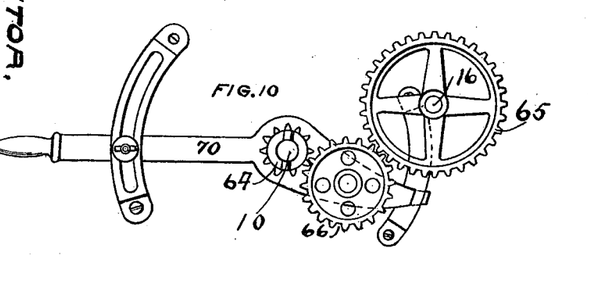
Fig. 10 is a detail view of the adjustable gear for driving the carrier.

The operating connection between the pulley 57 and the carrier is shown in Figs. 1, 2, 4, 6, and 10. 64 represents a pinion that is loose on the shaft 10 and is connected with the pulley 57. I employ a small pinion to obtain the necessary reduction of speed between the shafts 10 and 16. The shaft 16 bears a gear-wheel 65, that is driven in the proper direction by an idler 66, meshing therewith and with the pinion 64. The retarding device or belt is driven from the carrier-shaft 16 through the medium of a small reversing-gear 67 upon the shaft 16 and a stud-shaft 68 upon the side of the body 5. A sprocket-belt 69 extends from a sprocket-wheel on the stud 68, rotating with said gear 67, to a sprocket-wheel upon the upper shaft 26 of the retarding-belt, which latter is driven in an opposite direction to the carrier and at the same speed. In order that the speed of the carrier may be changed, I provide several gears 65 of different sizes, any one of which may be placed upon the shaft 16, and the idler 66 is arranged upon a swinging arm or lever 70, pivoted upon the shaft 10, so that the idler is adjustable to different gears 65. The lever 70 may be locked in any suitable manner, as indicated in Figs. 1 and 10.

In place of the shifting lever 70 and the idler 66 I may employ a vertically-adjustable stud-shaft 80, arranged upon a suitable block 81, held in a vertical guide 82, provided upon the side of frame 5 of the machine. The stud carries the speed-reducing gear-wheel 83, that meshes with the pinion 64, that is journaled upon the shaft or arbor 10, and is controlled by the governor. The governor is indicated in dotted lines in Fig. 15. The vertical position of the stud 80 determines the size of the reducing-gear 83 that may be employed between the same and the pinion 64. The driving connection between the gear 83 and the shafts 16 and 26 is made through a sprocket-belt 84, traveling over sprocket-wheels 85, 86, and 87 upon the gear 83 and the shafts 16 and 26, respectively. Said belt 84 travels over guide-pulleys 88, one of which is adjustable, as shown, to take up the slack in the belt and to permit the slacking of the belt, so as to allow the belt to be removed from the sprocket-wheel 85, so that the gear 83 may be changed. As shown in Fig. 16, the reducing-gear 83 has a long hub, upon which the sprocket-wheel 85 is secured and from which it may be removed for use with a larger or a smaller gear 83. I prefer this driving mechanism to that shown in the other figures of the drawings, as it is cheaper and is confined to one side of the machine.

The operation of my band-cutter and feeder will be understood from the foregoing.

As the details in the construction of my machine may be altered, particularly with regard to the driving mechanism, I do not confine my invention to the specific construction herein shown and described.

Having thus described my invention, I claim as new and desire to secure by Letters Patent—

1. In a band-cutter and feeder, the combination of the feed-board, with the bundle-carrier, a rotary band-cutting and grain-feeding mechanism interposed between said carrier and said feed-board and upon and over which the bundles are delivered by said carrier, to be spread and fed to the cylinder by said mechanism, said mechanism being disposed or arranged above said feed-board, with an unobstructed space between the same and said mechanism, and a retarding device arranged and operating above said cutting and feeding mechanism, moving with the said cutting mechanism to advance the grain toward the cylinder but at a slower speed than said mechanism to hold back the upper parts of the bundles after the bands thereof are cut by said mechanism, substantially as described.

2. In a band-cutter and feeder, the combination of the feed-board, with the bundle-carrier, a rotary band-cutting and feeding mechanism interposed between said carrier and said feed-board and upon which the bundles are delivered by said carrier, and said mechanism being disposed or arranged higher than said feed-board, and a retarding device arranged above said mechanism and operating at a slower speed to withhold the tops of the bundles, without compressing the bundles, substantially as and for the purpose specified.

3. In a band-cutter and feeder, the combination, of the feed-board, with means arranged above the same for cutting the bundle-bands and spreading the bundles, means for delivering the bundles upon the cutting means, and a retarding device arranged above said cutting means and at a greater distance above said feed-board, and operating at a slower speed than said cutting means to withhold part of the bundle and loosen the same, as and for the purpose specified.

4. In a band-cutter and feeder, the combination, of the feed-board, with the rotary knives arranged above the same, the bundle-carrier operating at less speed than said knives and adapted to deliver bundles thereon, to be cut and spread thereby, and a retarding device operating substantially at the same speed as said carrier, arranged above said knives to engage the tops of the bundles, whereby the upper parts of the bundles are withheld and the bundle is loosened until and as the lower parts are fed away by said rotary knives, substantially as described.

5. In a band-cutter and feeder, the combination, with the threshing-cylinder, of the bundle-carrier adapted to deliver bundles at a point above the level of said cylinder, rotary knives provided between the delivery end of said carrier and said cylinder and whereby the bundle-bands are cut from beneath, and the lower parts of the bundles are fed toward the cylinder, and a retarding device moving above said knives at substantially the speed of said carrier to temporarily hold the tops of said bundles and drop the same after the lower part has been fed to the cylinder by the operation of said knives, substantially as described.

6. In a band-cutter and feeder, the combination, of the threshing-cylinder, with the bundle-carrier, rotary knives, interposed between the delivery end of said carrier and said cylinder, a way leading downward from said carrier, to conduct the grain in a loose condition to the cylinder, and a moving retarding device operating toward said cylinder at substantially the speed of said carrier, said retarding device holding the bundles upon said knives and retarding or withholding the upper parts of the bundles, substantially as described.

7. In a band-cutter and feeder, the combination, of the threshing-cylinder, with the rotary knives arranged before the same and above said cylinder means for delivering grain upon said knives, to be thrown thereby downward to said cylinder, and a retarding device arranged above said knives and operating toward the cylinder at a slower speed than said knives, to hold the tops of the bundles or upper portions of the grain in a substantially horizontal position, as and for the purpose specified.

8. The combination, of the threshing-cylinder, with the rotary knives arranged above the same and operating toward the cylinder, a bundle-carrier from the delivery end of which the bundles are fed upon the tops of said knives, an inclined floor or guide arranged between said cylinder and the knives, and whereon the grain slides to the cylinder, and a retarding device arranged above said knives and more slowly moving toward said cylinder, and wherefrom the grain frees itself and falls upon said floor or guide, substantially as described.

9. In a band-cutter and feeder, the combination, of the threshing-cylinder, with the bundle-carrier, rotary knives over which the bundles are delivered by said carrier, and whereby the grain is fed downwardly from the carrier to said cylinder, a retarding device arranged above said knives and operating toward said cylinder at a slower speed than said knives, to withhold the tops of the bundles and tending to move the same in a horizontal plane without compressing the grain, and a bundle-feed-limiting mechanism arranged over said carrier, substantially as described.

10. In a band-cutter and feeder, the combination, of the cylinder, with the inclined floor or guide arranged before the same, rotary knives operating through said floor, a bundle-carrier for the delivery of the bundles upon said floor and knives, and a slowly-moving retarding device arranged above said knives retarding and loosening the grain after the bands are cut, substantially as described.

11. In a band-cutter and feeder, the combination, of the cylinder, with the inclined floor or guide before and above the same, rotary knives operating through said floor, the bundle-carrier for delivering bundles upon said knives, a retarding device arranged above said knives, moving at substantially the speed of said carrier toward said cylinder, to temporarily withhold or retard the tops of the bundles, and the feed-limiting device adjustably arranged above said carrier and operating to throw overplus bundles toward the receiving or outer end of said carrier, substantially as described.

12. In a band-cutter and feeder, the combination, of the cylinder, with the rotary knives, the bundle-carrier arranged to deliver bundles upon the tops of said knives, and an adjustable slowly-moving retarding device arranged above said knives to withhold the tops of the bundles until the lower parts thereof have been fed to said cylinders by said knives, substantially as described.

13. In a band-cutter and feeder, the combination, of the cylinder with the rotary knives, the bundle-carrier and the retarding device having its active part moving toward said cylinder above said knives at a slower speed than the same, to engage the tops of the bundles, and said retarding device inclined downwardly toward the end of said carrier and then extending beyond the knives toward said cylinder in a substantially horizontal plane, that is diverging from the plane in which grain is fed to the cylinder from the knives, substantially as described.

14. In a band-cutter and feeder, the combination, of the band-cutting knives, with the retarding device arranged above the same to move the tops of the bundles at a slower speed than the lower part thereof engaged by said knives, said retarding device being adapted to be deflected and adjusted at its middle point with relation to said knives, substantially as described.

15. In a band-cutter and feeder, the combination, of the cutting mechanism, with a retarding device arranged above the same and comprising pivotally-connected parts, an endless conveyer supported by said parts and adapted therewith to be deflected toward or from said knives without altering the elevations of the ends of the conveyers, substantially as described.

16. The combination, in a band-cutter and feeder, of a threshing-cylinder, with the rotary knives, the inclined floor or guide through which said knives operate, the pivoted extension and protector 12, at the lower end of said floor or guide, and the bundle-carrier, substantially as described.

17. In a band-cutter and feeder, the combination, with the band-cutting and feeding mechanism, of the bundle-carrier, the bundle-feed-limiting mechanism arranged above said carrier and before the cutting mechanism, adjustable supports for said mechanism, and the upright driving-shaft wherewith said mechanism has an adjustable or slidable driving connection, substantially as described.

18. In a band-cutter and feeder, the combination, with the main body or frame, of the bundle-carrier having its delivery end pivoted thereon, the divider-board provided with the T-head 19, a support in said frame having a transverse slot therefor, the pivoted arm arranged at the receiving end of said carrier and slotted to receive the ends of said board, and a pivotal attachment for said board in said arm, substantially as described.

19. The combination in a band-cutter and feeder, of the threshing-cylinder, with the cutting and feeding knives, the moving retarding device arranged above said knives, the bundle-carrier to deliver the bundles between said knives and said retarding device, the governor having a driving connection with said knives and a clutch connection with said retarding device and said carrier, the latter connection being completed through the medium of an adjustably-centered gear-wheel and an adjustable sprocket-belt, substantially as described.

20. In a band-cutter and feeder, the combination of the threshing-cylinder with the bundle-carrier, rotary knives over which the bundles are delivered by said carrier and by which knives the grain is fed to said cylinder, a retarding device arranged above said knives and operating toward said cylinder at a slower speed than said knives to carry the bundles upon said knives and then hold back and loosen the upper parts of the bundles after the bands are cut while moving such parts toward the cylinder and dropping the same after the lower parts of the bundles are fed away by said knives, substantially as described.

21. In a band-cutter and feeder, the combination of a suitable frame, with the band-cutting and feeding mechanism arranged in the lower parts thereof, and a retarding mechanism arranged above said cutting and feeding mechanism and comprising the front and rear parts pivotally connected, an endless carrier thereon, arms arranged substantially at the pivot between said parts, rollers thereon to engage the top sides of the endless conveyer, and means for deflecting said retarding device at its pivotal point, means for raising and lowering the retarding device at its pivotal point while the positions of the ends thereof remain substantially the same, whereby the distance between the retarding device and the cutting and feeding mechanism may be altered, substantially as described.

22. In a band-cutter and feeder, the combination of the feeder-frame, with the bundle-carrier having a frame provided with an intermediate joint or pivot permitting the outer portion thereof to be dropped with relation to the inner part and said inner part being pivoted substantially at the inner ends of the carrier, rotary knives arranged in said feeder-frame and over which the bundles are delivered by said carrier, the said knives adapted to cut the band and feed the grain to said cylinder, and a retarding device arranged above said knives and operating toward said cylinder at a slower speed than said knives to withhold the tops of the bundles and tending to loosen the same while approaching said cylinder, substantially as described.

23. In a band-cutter and feeder, the combination of the cylinder, with the band-cutting knives, the bundle-carrier to deliver bundles over said knives, the retarding device arranged above said knives, said retarding device and carrier being connected for operation at substantially the same speed, means for driving said knives with said cylinder, and a governor interposed between said knives and said carrier and retarding device, and dependent for its operation upon the speed of said threshing-cylinder, whereby said carrier and said retarding device are stopped when the speed of the threshing-cylinder falls below threshing speed, while the knives continue to rotate, substantially as described.

24. In a spreader mechanism for band-cutters and feeders, the combination of side bars composed of pivotally-connected parts, an endless carrier supported by said parts, a shaft pivotally connecting the parts of the conveyer, pinions secured to the end portions of the shaft, rack-bars having the pinions intermeshing therewith, and means for turning the shaft to raise and lower the middle portion of the spreader, substantially as set forth.

25. In a band-cutter and feeder, the combination of a shaft, sectional side bars having their parts pivotally connected and loosely mounted upon the aforesaid shaft, an endless carrier, a shaft in line with the axis of the front and rear parts of the spreader, means for raising and lowering the shaft to deflect the spreader intermediate of its ends more or less, rollers mounted upon the last-mentioned shaft and coming between the upper and lower parts of the endless carrier, and other rollers adapted to engage with the top side of the endless carrier and attached to the adjusting-shaft, substantially as set forth.

In testimony whereof I have hereunto set my hand this 29th day of September, 1898.

AUGUST J. HEINE.

In presence of—
CHARLES SCOTT,
S. H. SNYDER.